Patented Oct. 21, 1941

2,259,936

UNITED STATES PATENT OFFICE 2,259,936

PROCESS OF PREPARING DUROHYDROQUINONE

Fritz Jung, Darmstadt, Germany, assignor to Merck & Co. Inc., Rahway, N. J., a corporation of New Jersey No Drawing. Application July 26, 1938, Serial No. 221,445. In Germany July 30, 1937

5 Claims. (Cl. 260—621)

This invention relates to a process of preparing durohydroquinone, and more particularly to a simple and efficient method of preparing the same.

Heretofore, durohydroquinone has been prepared by reducing duroquinone with reducing agents, such as:

(a) Zinc dust and glacial acetic acid or caustic soda solution (Nef, Annalen der Chemie, vol. 237, p. 6). The product thus obtained showed a melting point of 210°;

(b) Zinc dust and caustic soda solution (von Pechmann, Berichte der deutschen chemischen Gesellschaft, vol. 21, p. 1421) likewise gave a product with a melting point of 210°;

(c) Phenyl hydrazine (Otto and von Pechmann, Berichte der deutschen chemischen Gesellschaft, vol. 22, p. 2116, note) melting point not stated;

(d) Aniline (Rügheimer and Hankel, Berichte der deutschen chemischen Gesellschaft, vol. 29, p. 2174); melting point 200°;

(e) Stannous chloride (Conant and Fieser, journal of the American Chemical Society, vol. 45, p. 2200). Melting point 226 to 227°.

The widely different melting points of the durohydroquinone obtained according to the above methods indicate that the products are not pure, the melting point of pure durohydroquinone being 233–234° C. (uncorrected). The above art does not state the yield obtained, except in the case of aniline, in which 0.90 to 0.95 g. of durohydroquinone is obtained from 2 g. of duroquinone, or 44 to 47% theory.

The known methods for the preparation of durohydroquinone are not suitable for the manufacture of large quantities of the same, because the working up of the reaction mixture, and particularly the separation of the end product from the unreacted material and the conversion products of the reducing agents, is complicated. Inasmuch as solutions of durohydroquinone are highly sensitive to atmospheric oxygen, a simplified process for its preparation is highly desirable.

I have discovered that durohydroquinone may be easily and efficiently prepared, with good yield, by reducing duroquinone in an organic solvent by means of hydrogen in the presence of a hydrogenation catalyst. According to this method, the end product can be easily separated from the reaction mixture, a very pure product being obtained after one recrystallization, having a melting point of the pure compound, 233–234° C. (uncorrected), and with a yield of up to about 95% of theory.

The various known hydrogenation catalysts may be used in the reaction, for example precious metal catalysts and such as palladiumized charcoal, platinized charcoal, platinum oxide, etc. Various organic solvents can be used, for example, alcohol, toluene, ether, glacial acetic acid, dilute acetic acid, etc. The hydrogenation can be carried out at room temperature and atmospheric pressure, or at elevated temperatures and pressures. In general, the reaction ceases when the theoretical quantity of hydrogen has been taken up by the duroquinone.

The quantity of catalyst required is extremely low, for example 2 g. of duroquinone can be completely hydrogenated when employing 5 mgs. of palladium catalyst. The desired reduction can not be effected by merely shaking in a hydrogen atmosphere without a catalyst, but under certain circumstances, hydrogenation may be effected in the presence of a poisoned catalyst.

The following examples illustrate methods of carrying out this invention, but it is to be understood that these examples are by way of illustration and not of limitation.

Example I

A solution of 20 g. of duroquinone in 1½ liter of alcohol is shaken at room temperature with hydrogen, in the presence of 0.5 g. of 10% palladiumized charcoal. After about 40 minutes, the solution is decolorized and absorption of hydrogen ceases. The solution is filtered from the catalyst with the exclusion of air, and is evaporated to dryness in vacuo in a carbon dioxide atmosphere. Upon recrystallizing the residue from toluene, 19 g. of colorless needles, melting point 233–234° C., are obtained, the yield corresponding to about 94% of theory.

Example II 20 g. of duroquinone are dissolved in one liter of 96% glacial acetic acid, 0.5 g. of platinum oxide are added, and the mass is shaken at 60° C. with hydrogen until absorption of the hydrogen ceases. Such absorption corresponds to that of theory. The hot solution, separated from the catalyst with the exclusion of air, is worked up as in Example I. The yield is 18 g. of durohydroquinone, melting point 233–234° C., corresponding to 89% of theory.

Modifications may be made in carrying out this invention without departing from the spirit and scope thereof, and I am to be limited only by the appended claims.

I claim:

1. The process comprising treating duroquinone in an organic solvent with hydrogen in the presence of a noble metal hydrogenation catalyst, at a temperature between room temperature and 60° C.

2. The process comprising treating duroqinone in an organic solvent with hydrogen in the presence of a noble metal hydrogenation catalyst at ordinary temperature and atmospheric pressure.

3. The process comprising treating duroquinone in alcohol with hydrogen in the presence of a palladiumized charcoal catalyst, at a temperature between room temperature and 60° C.

4. The process comprising treating duroquinone in glacial acetic acid with hydrogen in the presence of a platinum oxide catalyst, at a temperature between room temperature and 60° C.

5. The process comprising treating duroquinone in an organic solvent with hydrogen in the presence of a noble metal hydrogenation catalyst at a temperature between room temperature and 60° C, filtering the catalyst from the solution with the exclusion of air, and recovering durohydroquinone.

FRITZ JUNG.